(12) United States Patent
Elgert et al.

(10) Patent No.: US 7,002,320 B2
(45) Date of Patent: Feb. 21, 2006

(54) POWER FACTOR CORRECTION CIRCUIT WITH A COIL

(75) Inventors: Achim Elgert, Dauchingen (DE); Michel Thibault, Angers (FR); Jean-Paul Louvel, Brigachtal (DE)

(73) Assignee: Thomson LIcensing S.A., Boulogne-Billancourt (FR)

( * ) Notice: Subject to any disclaimer, the term of this patent is extended or adjusted under 35 U.S.C. 154(b) by 78 days.

(21) Appl. No.: 10/484,336

(22) PCT Filed: Jul. 15, 2002

(86) PCT No.: PCT/EP02/07839

§ 371 (c)(1),
(2), (4) Date: Jun. 23, 2004

(87) PCT Pub. No.: WO03/010876

PCT Pub. Date: Feb. 6, 2003

(65) Prior Publication Data

US 2004/0222774 A1    Nov. 11, 2004

(30) Foreign Application Priority Data

Jul. 20, 2001  (DE) ............................... 101 35 599

(51) Int. Cl.
   G05F 1/70   (2006.01)

(52) U.S. Cl. .................................................. 323/207
(58) Field of Classification Search ................ 323/207, 323/205; 336/60, 219

See application file for complete search history.

(56) References Cited

U.S. PATENT DOCUMENTS

| 4,016,452 A | 4/1977 | Willis .......................... 315/278 |
| 4,307,334 A | 12/1981 | Peil et al. .................... 323/351 |
| 4,835,353 A | 5/1989 | Smith et al. ............. 219/10.55 |
| 5,349,517 A * | 9/1994 | Brennen ....................... 363/40 |
| 5,485,362 A | 1/1996 | Archer ......................... 363/24 |
| 5,675,491 A | 10/1997 | Kijima ....................... 363/133 |
| 5,986,898 A | 11/1999 | Meitzner et al. .............. 363/21 |
| 6,038,146 A | 3/2000 | Luo et al. |
| 6,075,431 A | 6/2000 | Honma ....................... 336/180 |
| 6,108,222 A | 8/2000 | Liang .......................... 363/48 |

FOREIGN PATENT DOCUMENTS

EP    0171690 A    2/1986

(Continued)

*Primary Examiner*—Shawn Riley
(74) *Attorney, Agent, or Firm*—Joseph S. Tripoli; Harvey D. Fried; Sammy S. Henig

(57) ABSTRACT

The switched-mode power supply according to the invention has a power factor correction circuit, which operates on the principle of a current pump and has a first coil for damping voltage spikes, as well as a second coil for power factor correction. The two inductances are in this case connected in series and are arranged on a coil former and on a common core. In one preferred exemplary embodiment, an E/E ferrite core is used as the core, and a coil former with chambers is used as the coil former, with the windings of the two inductances being arranged in different chambers. An empty chamber, which is located in the region of the air gap in the core, is advantageously arranged between the two inductances. This partially decouples the two inductances by means of the air gap, so that the damping response of the first inductance is better.

7 Claims, 1 Drawing Sheet

FOREIGN PATENT DOCUMENTS

| | | |
|---|---|---|
| EP | 0700145 A | 3/1996 |
| EP | 0725475 A | 8/1996 |
| GB | 594626 | 11/1947 |
| JP | 2000124045 | 4/2000 |
| JP | 2000353627 | 12/2000 |
| JP | 2001135528 | 5/2001 |

* cited by examiner

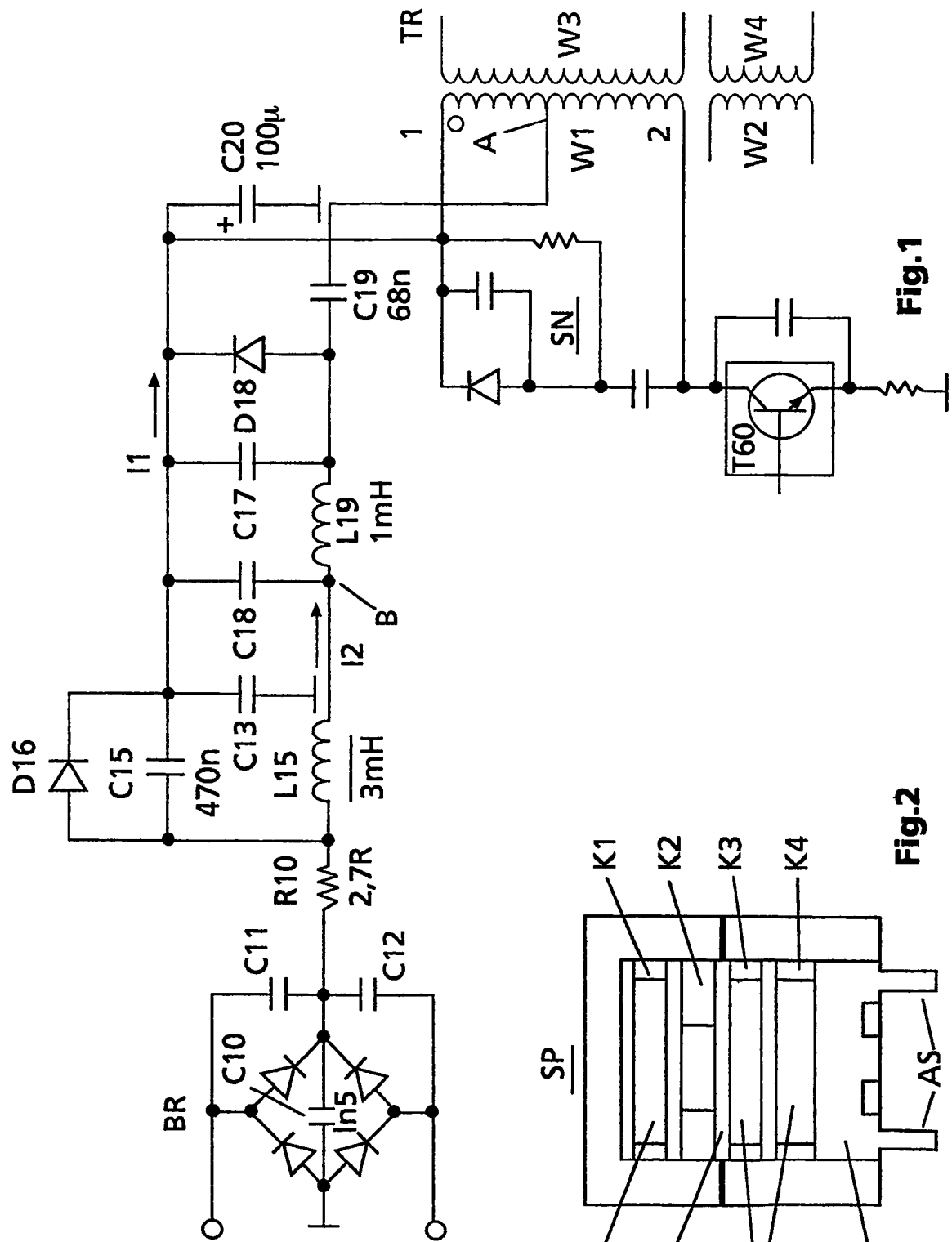

POWER FACTOR CORRECTION CIRCUIT WITH A COIL

This application claims the benefit under 35 U.S.C. § 365 of International Application PCT/EP02/07839, filed Jul. 15, 2002, which claims the benefit of German Patent Application No. 101 35 599.8, filed Jul. 20, 2001.

FIELD OF THE INVENTION

The invention is based on a switched-mode power supply with a so-called power factor correction circuit, which is used in order to reduce the harmonic load on the line network from the switched-mode power supply. It relates in particular to a power factor correction circuit which has a current pump with an inductance.

BACKGROUND OF THE INVENTION

Switched-mode power supplies produce a highly pulsed load on the line network, which leads to harmonic currents in the line network. This load occurs in particular in the region of the voltage maxima of the sinusoidal network voltage, in which area an energy storage capacitor in the switched-mode power supply is recharged. The harmonic load on the line network can be indicated by a so-called power factor value, whose value is less than or equal to unity and may, for example, be determined by means of appropriate measurement signals. Regulations for a lower power factor limit have already been introduced in various countries.

A switched-mode power supply which produces a reduced harmonic load on the line network is known, by way of example, from EP-A-0 700 145. Apart from a first current path, via which an energy storage capacitor in the switched-mode power supply is charged, this contains a second current path which has an inductance and produces a connection between a filter capacitor downstream from the network-?? rectifier, and a tap on the primary winding of the transformer. The inductance in this case acts as an energy store, which is charged in the phase when the switching transistor is switched on, and which then emits this energy to the energy storage capacitor in the phase when the switching transistor is switched off.

A further development of this switch-mode power supply is disclosed by a power factor correction circuit U.S. Pat. No. 5,986,898. This contains a capacitor in the second current path, which capacitor limits the current and in this way ensures the core of the inductance of the current path as well as the core on the primary winding or on the transformer do not saturate. In addition to the power factor inductance, which has a ferrite core, this power factor correction circuit also contains, in particular, the series inductance with an iron core, which acts as a damping element, in order to suppress the current pulses produced in the power factor inductance in the direction of the network connection.

EP-A-0 171 690 discloses a line deflection circuit for a television, in which a number of coil arrangements are used. A so-called bridge coil and an east-west drive coil for the deflection circuit are in this case combined in one coil arrangement, with a number of windings being arranged symmetrically alongside one another on a magnetic pin core. One of the coils, the bridge coil, is in this case subdivided into two outer windings, and the central winding corresponds to the east-west drive coil. The two windings of the bridge coil are in this case arranged with magnetically opposing plurality, and the central winding operates in a different frequency band. The two coils in the deflection circuit are connected in parallel, and are used for two different electrical functions.

SUMMARY OF THE INVENTION

The object of the present invention is to specify a switched-mode power supply of the type mentioned initially, which has reliability while its costs are at the same time reduced.

This object is achieved by the features of Claim 1. Advantageous developments of the invention are specified in the dependent claims. Furthermore, a power factor correction circuit and a coil are specified for a corresponding switch-mode power supply, as well as dependent claims relating to them.

The switching-mode power supply according to the invention has a power factor correction circuit which operates on the principle of a current pump and has a first coil for damping voltage spikes, as well as a second coil for power factor correction. The two coils are in this case connected in series and are arranged on a common core, and the windings of these coils are arranged on a common coil former.

Although the arrangement of the two inductances in one coil makes the damping effect of the inductance of the first coil poorer than that of a separate coil with an iron core, since there is an interaction via the common core between the two inductances, it has nevertheless been found that the coil with the combined inductances has a completely sufficient damping effect for the switched-mode power supply.

In one preferred exemplary embodiment, an E/E ferrite core is used as the core and a coil former with chambers is used as the coil former, with the windings of the two inductances being arranged in different chambers. An empty chamber is advantageously arranged in the coil former between the two inductances, and is located in the region of an air gap in the core, so that the one inductance is located above the one inner core limb half, and the other inductance is located above the other inner core limb half of the core. The air gap in the core is thus, in particular, arranged with respect to the inner core limbs such as the two core inductances are at least partially decoupled by the air gap, thus improving the damping response of the first coil.

The two inductances which are arranged on the coil former advantageously have opposite winding senses, so that their magnetizations partially cancel one another out in the core. Since the inductances are connected in series and are thus loaded at the same frequency and, partially, by the same currents, the core is less highly loaded, and thus does not saturate, even at relatively high currents. It is thus possible to use the same ferrite core which was also used previously for the individual power factor correction coil, so that the combination of the two coils thus occupies only the same space as a single coil. This thus not only resolves in more space on the board, but also completely saves one relatively heavy iron coil.

BRIEF DESCRIPTION OF THE DRAWINGS

The invention will be explained in more detail in the following text using, by way of example, an exemplary embodiment which is illustrated schematically in the figures, in which:

FIG. 1 shows a simplified circuit diagram of a switched-mode power supply with a power factor correction circuit, and FIG. 2 shows a coil with a first inductance for damping voltage spikes, and with a second inductance for power factor correction.

DETAILED DESCRIPTION

FIG. 1 shows, in simplified form, a switched-mode power supply with a transformer TR which has a primary winding W1 and secondary windings W2, W3 and W4, as well as a switching transistor T60, which is connected in series with the primary winding W1. The base of the switching transistor T60 is driven in the known manner by a driver circuit (not illustrated), so that, during operation, energy is transmitted from the primary winding W1 to the windings W3 and W4 that are located on the secondary side, as well as to the winding W2, which is arranged on the primary side and is used in particular for supplying the driver circuit. Furthermore, a so-called snubber network SN is arranged in a known manner in parallel with the primary winding W1. Switched-mode power supplies such as these are used, for example, in televisions and, for this power range, are generally in the form of flyback converters.

On the input side, with respect to one connection UN of the line network, the switched-mode power supply has a rectifier BR, in this exemplary embodiment a bridge rectifier with four diodes, at whose output a filter capacitor C10 is connected to earth. This capacitor C10 has a small capacitance and is used essentially for interference frequency filtering, so that a 100 Hz signal, which essentially has no interference and is produced by the rectifier element BR, is produced across this capacitor C10 during normal operation of the switched-mode power supply.

The capacitor C10 is connected to a resistor R10, to which a first current path I1 is coupled, through which an energy storage capacitor C20 is charged via a diode D16. This capacitor is connected in parallel with the series circuit formed from the primary winding W1 and the switching transistor T60, and supplies voltage to the primary winding W1. The diode D16 is required in particular in order to provide an adequate voltage across the capacitor C20 for starting the switched-mode power supply.

Furthermore, the resistor R10 is coupled to a second current path I2, which, operating on the principle of a current pump, provides the power factor correction for the switched-mode power supply, and which is connected on the output side to a tap A on the primary winding W1. The tap A in this exemplary embodiment subdivides the primary winding W1 into two parts, such that one third of the turns are located between the connection 1 of the winding W1 and the tap A, and two thirds of the turns are located between the tap A and the connection 2 of the primary winding W1. However, this turns ratio can also be configured differently as appropriate for other switched-mode power supply requirements and, for example, it is also possible for there to be no need for the tap A with the connection 2.

In detail, the current path I2 in this exemplary embodiment has a first coil L15 with an inductance of 3 mH, which is used for damping voltage spikes, as well as a second coil L19 with an inductance of 1 mH, which is connected via a capacitor C19 to the tap A, and via a diode D18 to the energy storage capacitor C20. The coil L19 is thus connected to the switching transistor T60, so that a current is in each case drawn via the coil L19 when the switching transistor T60 is switched on. The circuit is in this case designed such that, during normal operation, the energy storage capacitor C20 is essentially charged by means of the current pump only via the primary winding W1 and the diode D18, but not via the diode D16. During operation, the frequency of 100 Hz across the filter capacitor C10 is thus essentially unchanged, since the second current path I2 together with the charge pump draws a continuous current therefrom.

The capacitor C19 may also have added to it, or be replaced by, a diode which makes it possible to prevent the plurality of the coil L19 from being reversed. In this case, the capacitor C19 is used for current limiting purposes, which prevents an excessively high current from saturating the core of the transformer TR or one of the inductances L15, L19 in the power factor correction circuit.

A tap B, which is connected via a capacitor C18 to the energy storage capacitor C20, is arranged between the two coils L15 and L19, since the capacitor C20 has a high DC voltage component, the coil L15 and the capacitor C18 act like an LC element for the coil L19. The current pulses of the coil L19, which correspond to the switching frequency of the switching transistor T60, are in this way damped, thus reducing the harmonic load on the line network. Furthermore, capacitances C11, C12 are also connected in parallel with the diodes of the rectifier element BR, and are used to damp the switching spikes of these diodes; a capacitance C15 is likewise connected in parallel with the diode D16, and the capacitance C17 is connected in parallel with the diode D18.

The two coils L15 and L19 have a common core CR, and are arranged on a single coil former SK as is illustrated in FIG. 2. In this exemplary embodiment, the core CR is a E/E core with two identical core halves, above whose inner core limb the coil former SK is arranged. The coil former SK is cylindrical and has chambers K1 to K4, in which the windings of the coils are arranged.

In this exemplary embodiment, the winding W16 of the coil L15 is arranged in the uppermost chamber K1, and the winding W19 of the coil L19 is arranged in the lower chambers K3 and K4. In consequence, the winding W15 is located above the upper half of the inner core limb, and the winding W19 is located above the lower half of the inner core limb. They are physically separated from one another by an empty chamber K2. The core CR has an air gap AG between the two core limb halves of the inner core limb, and the empty chamber K2 is located in particular in the region of this air gap, thus reducing the losses in the coil LP and at least partially magnetically decoupling the two coils.

Furthermore, the windings of the two coils L15 and L19 have an opposite winding sense, so that their magnetizations partially cancel one another out in the core, since the two coils are operated at the same frequency, because they are connected in series. The core CR can thus be loaded by higher currents while its size remains the same, so that firstly, it is possible to use the same core type for the coil SP as was previously required for the individual coil L19 and, furthermore, the air gap between the inner core limb halves can be reduced in size owing to the opposite winding sense, so that both the stray field and the losses of the coil SP are reduced in comparison to the separate arrangement. Furthermore, the coil SP has four connections AS, by means of which it can be mounted on an appropriate printed circuit board, which is not illustrated.

The damping response of the power factor connection circuit is admittedly made somewhat worse by the combination of the two coils, but this allows the costs of the switched-mode power supply to be reduced considerably and, furthermore, it can be constructed to be more compact.

However, the requirements for the power factor are not significantly infringed, and there is thus no need for any further damping measures for the switched-mode power supply.

What is claimed is:

1. Switched-mode power supply having a rectifier element, a dowstream energy storage capacitor, a transformer, whose primary winding is coupled to the energy storage capacitor and is connected in series with a switching transistor, and having a power factor correction circuit, which forms a current path between the rectifier element and one connection of the primary winding, and which has a first coil for damping voltage spikes, as well as a second coil for power factor correction, wherein the two coils having a common core, and the windings of the two coils are arranged on a common coil former, the coil former comprises chambers, and the windings of the two coils are arranged in different chambers, the windings have opposite winding senses, so that their magnetizations partially cancel one another out in the core, and an empty chamber is located between the two windings.

2. Switched-mode power supply according to claim 1, wherein the core is an E/E ferrite core, and the coil former is located above the inner core limb.

3. Switched-mode power supply according to claim 2, wherein the inner core limb E/E ferrite core has an air gap, and in that the empty chamber is located in the region of this air gap.

4. Switched-mode power supply according to claim 1, wherein the two coils are connected in series and have a tap, which is located in between them and which is connected via a capacitor to the energy storage capacitor.

5. Coil for a switched-mode power supply having a power factor correction circuit, wherein the coil has a coil former on which a winding of a first coil for damping voltage spikes is wound, and on which a winding of a second coil, which is connected in series with the first winding, for power factor correction is wound, the two coils have a common core and the coil former comprises chambers, the windings of the two coils being arranged in different chambers, and an empty chamber is located between the two windings.

6. Coil according to claim 5, wherein the coil has an E/E ferrite core, above whose inner core limb the coil former is arranged, and in that the two coils are wound over in each case one inner core limb half such that they are physically separated.

7. Coil according to claim 5, wherein windings of the two coils have opposite winding senses.

* * * * *